United States Patent Office 3,471,345
Patented Oct. 7, 1969

---

3,471,345
SMOKE-PRODUCING COMPOSITION CONTAINING LITHIUM PERCHLORATE AND A SILICON-CONTAINING FUEL
George A. Lane and William A. Smith, Midland, Mich., assignors to The Dow Chemical Company, Midland, Mich., a corporation of Delaware
No Drawing. Filed July 1, 1968, Ser. No. 741,243
Int. Cl. C06d 3/00; C06b 11/00
U.S. Cl. 149—42                    7 Claims

ABSTRACT OF THE DISCLOSURE

The present invention relates to pressed pyrotechnic smoke-producing compositions comprising a silicon-containing fuel and an oxidizer.

---

Background of disclosure

Frequently in wartime, military forces find it necessary to employ screening smokes to obscure the view of the enemy. Materials which have been employed to produce screening smokes usually contain compounds such as white phosphorus, titanium tetrachloride, chlorosulfonic acid, sulfur trioxide, zinc or various oils. All of these agents, with the exception of the oils, react with the atmosphere to form products which are toxic as well as corrosive. Oil smokes are non-toxic and non-corrosive but have relatively poor obscuring power.

It is an object of the present invention to provide a composition which can be ignited to produce voluminous and dense obscuration smokes which are also non-corrosive and non-toxic.

This and other objects and advantages of the present invention will become apparent from the following description thereof.

SUMMARY OF THE INVENTION

The pyrotechnic smoke-producing compositions of the present invention generally comprise on a weight basis from about twenty to about seventy percent of a silicon-containing fuel, and from about seventy-five to about thirty percent of an oxidizer. The silicon-containing fuel, ordinarily is a member selected from the group consisting of elemental silicon, silicon carbide, polymethyl polysilanes, or mixtures thereof. Those silicon-containing materials which are liquids ordinarily are absorbed onto or into porous carrier media, e.g. porous silicates and the resulting particulate mixture compounded with the oxidizer to provide the pyrotechnic smoke-producing grain or propellant. This serves to assure a more uniform distribution of the liquid fuel components in the products as well as facilitate fabrication, handling, and storage. Additional fuels which can be employed in the present invention are silicides such as magnesium and zirconium silicides. The oxidizer is a member selected from the group consisting of alkali metal or ammonium chlorates, perchlorates, nitrates, or mixtures thereof.

Generally the particle size of the fuel and oxidizer can range up to a maximum of forty mesh U.S. Sieve Series. Preferably, particle size will range from about 0.1 to about 200 micron as efficiency in smoke production increases as particle size decreases.

To fabricate the smoke-producing munition, the fuel and oxidizer are admixed until substantially homogeneous, and the admixture is poured into a suitable container and compressed by commonly employed means at a pressure of about 2000 p.s.i. to yield the pressed grain munition. Prior to ignition, the munition can be initiated with any commonly employed ignition system, such as a fuse.

PREFERRED EMBODIMENTS

A preferred embodiment of the present invention is the pyrothechnic smoke composition consisting on a weight basis of from about 30 to about 60 percent of elemental silicon fuel, and from about 70 to about 40 percent of substantially anhydrous lithium perchlorate oxidizer.

Excellent smoke-production is achieved where the composition consists by weight of from about 30 to about 40 percent elemental silicon fuel, and from about 70 to about 60 percent of substantially anhydrous lithium perchlorate oxidizer.

The pyrotechnic smoke composition of the present invention is fabricated by admixing the fuel and oxidizer until a substantially homogeneous blend is obtained, inserting the so-homogenized blend into a metal cannister and compacting the so-inserted mixture at about 2000 p.s.i. An ignition fuse can be attached to the surface of the resulting compacted product prior to ignition.

Another preferred embodiment of the present invention is the composition consisting by weight of from about 40 to about 60 percent silicon carbide fuel, and about 60 to about 40 percent substantially anhydrous lithium perchlorate oxidizer. The pyrotechnic smoke-disseminating munition product is fabricated by the compaction process described directly hereinabove.

Example 1

About 3.5 grams of particulate elemental silicon wherein the particles were about 10 microns in size was admixed with about 6.5 grams of particulate, substantially anhydrous lithium perchlorate (particle size about 50 microns) to yield a substantially homogeneous blend. The so-homogenized blend was inserted into a metal cannister about 1½ inches in diameter and 1 inch high, and closed at one end, and compacted to about 2000 p.s.i. using a conventional hydraulic press. The so-compacted product was initiated with a Thermalite Ignitacord brand fuse. Upon ignition, the burning time, aerosol yield, and efficiency Aerosol yield (percentage)
$$= \frac{\text{Agent in Aerosol Form} \times 100}{\text{Total Weight Composition}}$$

Efficiency (percentage)
$$= \frac{\text{Agent in Aerosol Form} \times 100}{\text{Agent in Composition}}$$

were measured. Additionally, the total obscuring power (TOP) of each munition was measured in terms of area obscured per pound of munition employed.

Upon ignition the munition burned at a rate of about 0.022 inch/second to produce voluminous clouds of dense white obscuring smoke. The efficiency of the munition was about 47 percent, and the yield was about 35 percent. The obscuring power expressed in square feet obscured per pound of munition was 5000 ft.²/lb.

It should be noted that smoke production and obscuring power increase as the relative humidity increases. The above study was performed at a relative humidity of about 90 percent.

Example 2

Following substantially the same procedure as the one described in Example 1, other munitions of the present invention were tested in which the relative amounts of elemental silicon fuel and lithium perchlorate oxidizer were varied to determine the optimum percentage composition of fuel and oxidizer in relation to obscuring power. The results of these tests are set forth in Table I.

TABLE I

| Munition composition | Top, ft²/lb | Burning time (sec.) |
|---|---|---|
| 35% Si, 65% LiClO₄ | 4,100 | 13 |
| 40% Si, 60% LiClO₄ | 3,830 | 9 |
| 45% Si, 55% LiClO₄ | 3,240 | 7.5 |

From Table I it can be seen that the optimum percentage composition by weight for this particular system is about 35 percent elemental silicon and about 65 percent anhydrous lithium perchlorate.

Example 3

Employing substantially the procedure set forth in Example 1, other sample munitions were prepared and tested to determine the relationship between obscuring power and particle size of fuel. In all samples, the fuel employed was particulate elemental silicon and the oxidizer was particulate substantially anhydrous lithium perchlorate. The results are set forth in Table II.

TABLE II

| No. | Silicon, wt. percent | Particle size (U.S. sieve) | LiClO₄ wt. percent | Particle size (U.S. sieve) | Top, ft.²/lb. |
|---|---|---|---|---|---|
| 1 | 35 | 200–300 | 65 | 100 | 3,350 |
| 2 | 35 | 300–400 | 65 | 100 | 3,980 |
| 3 | 35 | 400 | 65 | 100 | 4,400 |

From Table II is can be seen that obscuring power rises as particle size of the fuel decreases.

Example 4

Employing substantially the proces set forth in Example 1 samples were prepared employing particulate silicon carbide and particulate substantially anhydrous lithium perchlorate. Combustion studies were conducted to determine the optimum percentage composition of fuel and oxidizer needed to maximize obscuring power. The results of these studies are set forth in Table III.

TABLE III

| No. | SiC, percent | LiClO₄, percent | Top | Relative humidity (percent) | Burning time (sec.) |
|---|---|---|---|---|---|
| 1 | 40 | 60 | 335 | 50 | 31.6 |
| 2 | 45 | 55 | 484 | 50 | 29.3 |
| 3 | 50 | 50 | 760 | 50 | 29.3 |
| 4 | 55 | 45 | 1,470 | 50 | 20.7 |
| 5 | 60 | 40 | 986 | 50 | 21.1 |

Example 5

About 6 grams of particulate substantially anhydrous LiClO₄ was mixed with about 4 grams of inert porous silicate particles containing hexamethyldisilane, said silicate particles contained about 3 grams of the hexamethyldisilane fuel sorbed thereon. The fuel-containing silicate particles and oxidizer particles were admixed until substantially homogeneous, and inserted into a steel cannister closed at one end. Employing a standard hydraulic press, the composition particles were compacted to about 2000 p.s.i. and the resulting so-compacted munition product was initiated with a Thermalite Ignitacord fuse. Upon ignition the product produced a volume of white obscuring smoke.

Example 6

Employing substantially the process described in Example 5, a sample munition composition was prepared wherein the fuel was about 4 grams hexamethyldisiloxane, and the oxidizer was about 16 grams of substantially anhydrous lithium perchlorate. The porous, inert, particulate absorbing material consisted essentially of inert silicates. Upon ignition the sample exhibited a burning rate of about .022 inch/second and a total obscuring power of about 1720 ft.²/lb.

The examples set forth directly hereinabove are intended to illustrate the invention and are not meant as a limit thereto for we limit said invention only by the appended claims.

We claim:
1. A pyrotechnic smoke composition comprising by weight from about 20 to about 70 percent of a silicon-containing fuel, and from about 75 to about 30 percent of particulate substantially anhydrous lithium perchlorate as oxidizer, said silicone containing fuel being a member selected from the group consisting of elemental silicon, silicon carbide, hexamethyldisilane, hexamethyldisiloxane, polymethylpolysilane, polymethylpolysiloxane, and mixtures thereof.

2. The composition defined in claim 1 and comprising from about 30 to about 60 percent by weight of elemental silicon and from about 70 to about 40 percent by weight of lithium perchlorate.

3. The composition as defined in claim 1 wherein from about 30 to about 40 percent by weight is elemental silicon, and from about 70 to about 60 percent by weight is said lithium perchlorate.

4. The composition defined in claim 1 wherein by weight from about 40 to about 60 percent is silicon carbide and from about 60 to about 40 percent is said lithium perchlorate.

5. The composition defined in claim 2 wherein by weight from about 50 to about 60 percent is silicon carbide, and from about 40 to about 50 percent is lithium perchlorate.

6. The composition defined in claim 1 wherein said silicon-containing fuel is selected from the group consisting of hexamethyldisilane, hexamethyldisiloxane, or mixtures thereof, and wherein said silicon-containing fuel is sorbed onto an inert porous particulate carrier.

7. The composition defined in claim 6 wherein from about 20 ot about 40 percent by weight is a member selected from the group consisting of hexamethyldisilane and hexamethyldisiloxane and wherein the porous carrier is an inorganic silicate.

References Cited

UNITED STATES PATENTS

| 1,310,466 | 7/1919 | Becket | 149—42 X |
| 2,410,801 | 11/1946 | Audrieth | 149—42 X |

CARL D. QUARFORTH, Primary Examiner

S. J. LECHERT, Assistant Examiner

U.S. Cl. X.R.

149—77, 83